(No Model.) 2 Sheets—Sheet 1.
J. A. STEVENS.
HOSE PIPE.
No. 473,716. Patented Apr. 26, 1892.
Fig. 1.
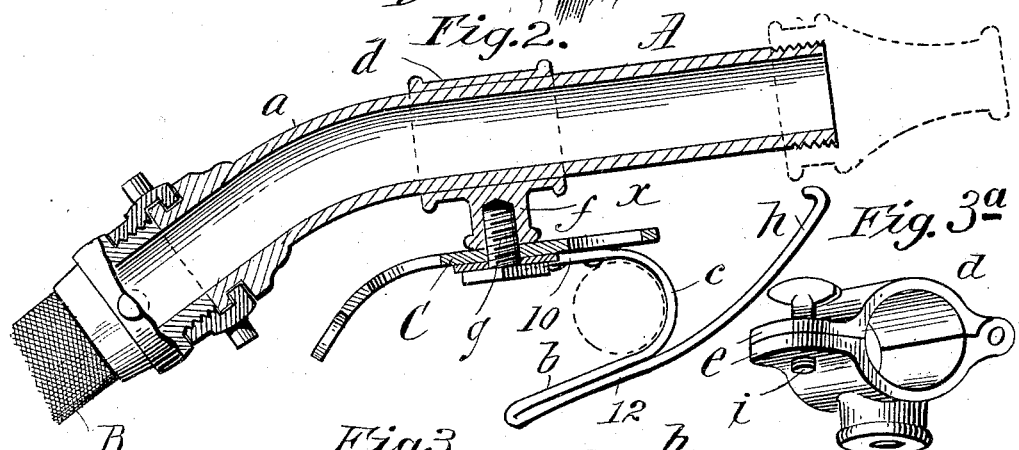
Fig. 2. Fig. 3ª
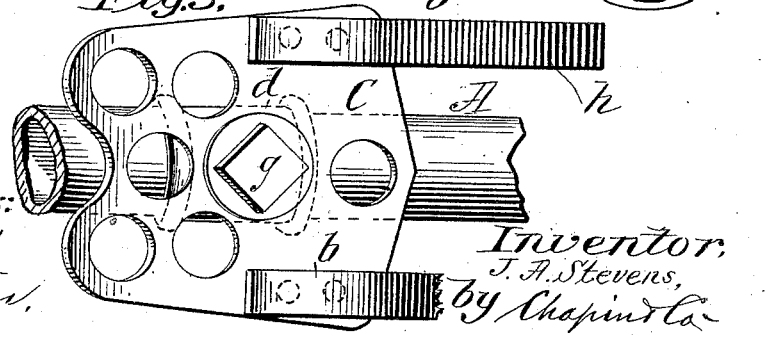
Fig. 3.
Witnesses:
Inventor:
J. A. Stevens,
by Chapin & Co.
Attorneys.

(No Model.) 2 Sheets—Sheet 2.

J. A. STEVENS.
HOSE PIPE.

No. 473,716. Patented Apr. 26, 1892.

Witnesses:
J. D. Garfield
F. F. Duncan

Inventor:
J. A. Stevens,
by Chapin & Co.
Attorneys

UNITED STATES PATENT OFFICE.

JOSEPH A. STEVENS, OF SPRINGFIELD, MASSACHUSETTS.

HOSE-PIPE.

SPECIFICATION forming part of Letters Patent No. 473,716, dated April 26, 1892.

Application filed August 20, 1891. Serial No. 403,250. (No model.)

*To all whom it may concern:*

Be it known that I, JOSEPH A. STEVENS, a citizen of the United States, residing at Springfield, in the county of Hampden and State of Massachusetts, have invented new and useful Improvements in Hose-Pipes, of which the following is a specification.

The object of the present invention is to render the hose-pipe capable of easier and more advantageous use than heretofore in the direction of the stream from the nozzle, and as will hereinafter be made more apparent.

The invention embodies the combination, with a hose-pipe, of a part to which the pipe is pivotally connected, whereby the pipe may have a swiveling support thereon, and which part is provided with a hook or yoke for ready and temporary engagement with and disengagement from a suitable support therefor—such, for instance, as the round of a ladder.

The invention further consists in constructions and combinations of parts, all substantially as will hereinafter more fully appear, and be set forth in the claims.

Figure 4:
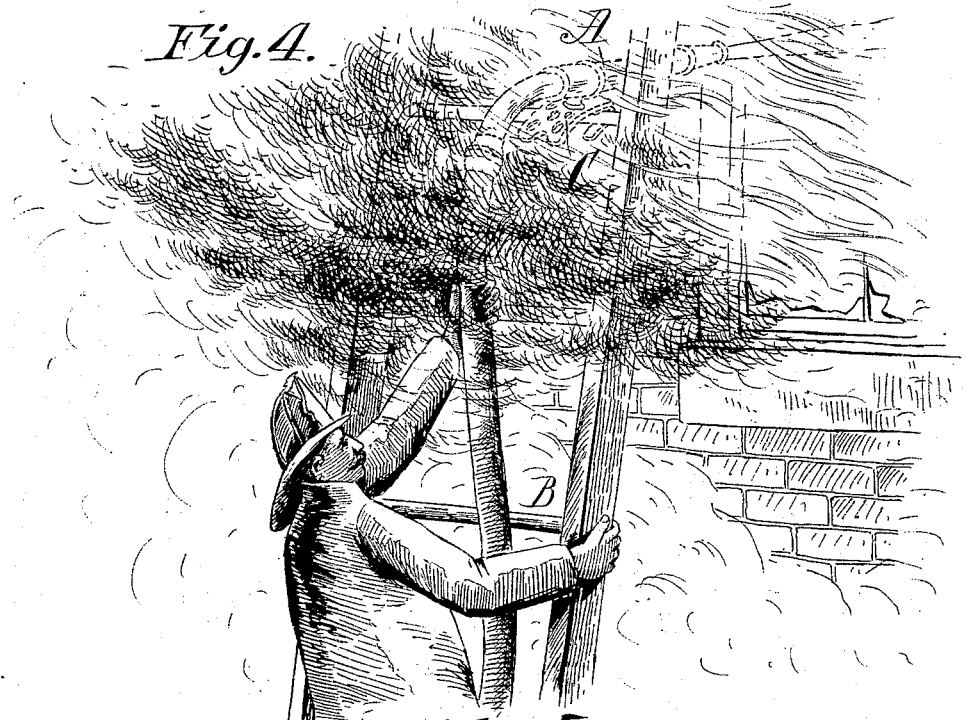
Figure 5:
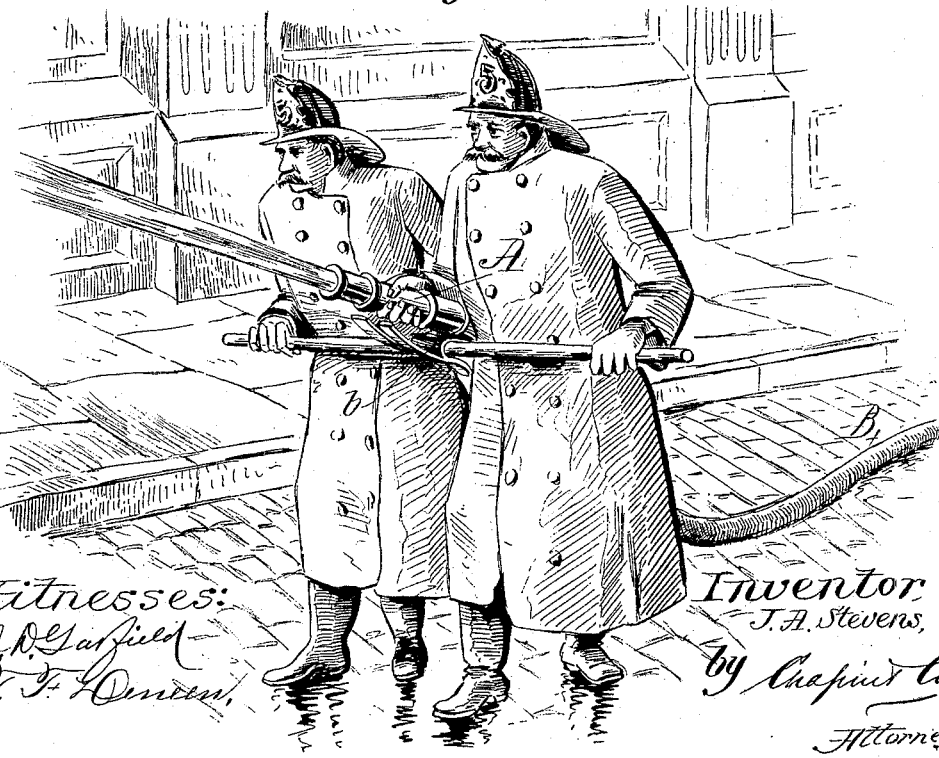

In the accompanying drawings the improved hose-pipe and auxiliaries are illustrated, Figure 1 being a perspective view indicating a manner of use of the same. Fig. 2 is a longitudinal sectional view of the improved hose-pipe on a large scale, Fig. 3 being a plan view of the under side thereof. Fig. 3ᵃ is a perspective view in detail to be hereinafter particularly referred to. Figs. 4 and 5 are illustrations of manners of use of which the improved hose-pipe is capable incidental to the present invention.

In the drawings, A represents the hose-pipe, which at its forward end may receive a nozzle, or it may be formed with a nozzle as one therewith. The hose-pipe is at its rear portion gradually bent more or less, as shown at $a$, receiving at its rear extremity one member of a coupling, whereby engagement may be made with the hose B. The hose-pipe is intermediately of its length connected with a supporting part C, so that it may swivel thereon about an axis of movement at right angles to the length of the pipe. The part C comprises a plate or body having on its under side one or more hooks $b\ b$, the intermediate bend or bight $c$ of the hook or hooks being forwardly disposed, as shown. A clip or collar $d$ closely encircles the hose-pipe above the said plate C, being provided on its under side with the boss or hub $f$, which is axially bored and tapped. The headed bolt $g$, passing loosely through the said hook-carrying plate and with a screw engagement into the hub, constitutes the swiveling engagement between the plate and pipe.

It is advantageous to form the collar or strap $d$ in such a manner that the auxiliary parts comprising said collar and the hook-carrying plate may be disconnected from the pipe and similarly applied with relation to another pipe, if desired, and therefore the collar, as shown in Fig. 3ᵃ, is formed in upper and lower sections, said sections at one side being hinge-connected and at the other side being provided with ear-pieces $e$ and adapted to be brought together to contract the collar by the set-screw $i$.

Now, as well known, at fires, in the use of hose having a pipe or nozzle at its end which is comparatively heavy, more or less difficulty is experienced in holding the pipe and properly directing the stream, especially if the fireman is upon a ladder, where extreme care must be exercised to avoid falling; but by the provision of the device described the work of the fireman is rendered much easier, safer, and more efficient, for on carrying the pipe up the ladder to the proper height the supporting-plate C is rested on a ladder-round, and then by one hand, as indicated in Fig. 1, the fireman can readily direct the stream, employing the other hand for whatever purpose it may be under the circumstances most available. Any direction may be imparted to the stream. If desired more or less elevated, the supporting-plate C and pipe are tilted as one from the place of engagement of the hook $d$, with the ladder-round as a horizontal axis; or if it is desired to direct the stream sidewise the pipe is turned on its pivotal connection with the support C.

The formation of the pipe with the bend $a$ obviates the liability which the hose would otherwise have next to the coupling of kinking, and thereby to retard the freedom of passage of the stream through the pipe.

In Figs. 2 and 3 there is shown a guard or fender $h$, which serves to aid in the proper placing of the hose and its support C at rest and in engagement with the round of a ladder, for the fireman on grasping the pipe $a$ at its rear portion, or the hose back of the pipe, more or less, as indicated in Fig. 4, may after having placed the nozzle end upon a round force the pipe forward, and the guard $h$ will prevent the angularly-disposed parts at the rear thereof—that is, the pipe and hub $f$ and the forward portion of the plate C, which parts are adjacent the letter $x$ in Fig. 2—from interlocking with the round, and preventing the necessary forward movement of the pipe over the round to insure the engagement therewith of the hook, and at such time the guard $h$ serves as a runner for guiding the parts to the engagement mentioned.

The engagement of the hook having been made with the round of the ladder or other supporting part, it is maintained without liability of becoming disengaged to the recoil or backward force on the pipe as the stream passes therethrough.

As shown in Fig. 2, the hook and guard members are integrally formed of strip metal, each hook comprising a section 10, which is riveted to the plate C, and the hook-bend and the reversely-bent and forwardly-extended section 12, which by its extremity constitutes said guard $h$.

Fig. 4 is designed to illustrate the manner in which the fireman may properly present the pipe in close proximity to the fire and direct the stream from a place where it would be impossible to approach himself, for it will be seen that, having effected the engagement of the pipe with the round of the ladder, which is in proximity to the fire, the fireman may assume a position considerably below and by grasping the hose with one hand cause the stream to be directed higher or lower or laterally in either direction, and this possibility is in part rendered easy due to the provision of the bend $a$ in the hose-pipe, as will be plain.

Fig. 5 is designed to illustrate the manner in which two firemen may more advantageously support the hose-pipe at the time a compound or unusually powerful stream is passing therethrough. By holding a bar horizontally across and in front of them the same forms by its intermediate portion a support in a manner like that of the ladder-round, and the men are thereby the better enabled to play steadily and in any direction desired.

Having thus described my invention, what I claim, and desire to secure by Letters Patent, is—

1. The combination, with a plate provided with a hook projected from its under side, of a hose-nozzle having its intermediate portion pivotally connected at the upper side of said hook-provided plate, with its rear portion extended back of said point of pivotal connection, whereby the hooked support may have a temporary engagement for a tilting movement of it and the nozzle in a vertical plane and whereby the nozzle may be by its rear end independently swung laterally on the hooked support, substantially as described.

2. The combination, with a hose-pipe having a collar provided with the boss $f$, of the plate C, thereunder provided with one or more hooks, and the headed bolt $g$, passed through the said plate and with an engagement into said boss, substantially as described.

3. The combination, with a hose-pipe, of a supporting-plate thereunder, to which the pipe is pivotally connected, and said plate having one or more hooks and a forwardly-extended guard or fender $h$, substantially as and for the purposes set forth.

4. The combination, with the hose-pipe, of the supporting-plate C thereunder, to which the pipe is pivotally connected, and said plate having the pair of members riveted thereto, each of which comprises the hook $b$, with its bend or bight forwardly disposed and the rear or lower section of the hook reversely bent and forwardly extended in the guard-section $h$, substantially as shown and described.

5. The combination, with a metallic hose-pipe having its rear portion bent, as described, of the supporting-plate under an intermediate portion of the pipe, with which said intermediate portion has a pivotal engagement, and said supporting part having a hook or hooks for engagement with an available support, substantially as and for the purposes set forth.

6. A hose-pipe provided on its under side with a hook or yoke and a forwardly-extended guard or fender, which is constituted by a continuation of the hook, substantially as and for the purposes set forth.

JOSEPH A. STEVENS.

Witnesses:
WM. S. BELLOWS,
J. D. GARFIELD.